Nov. 20, 1962  F. A. MICKLE ETAL  3,064,984
SEALING GROMMET
Filed Aug. 20, 1959
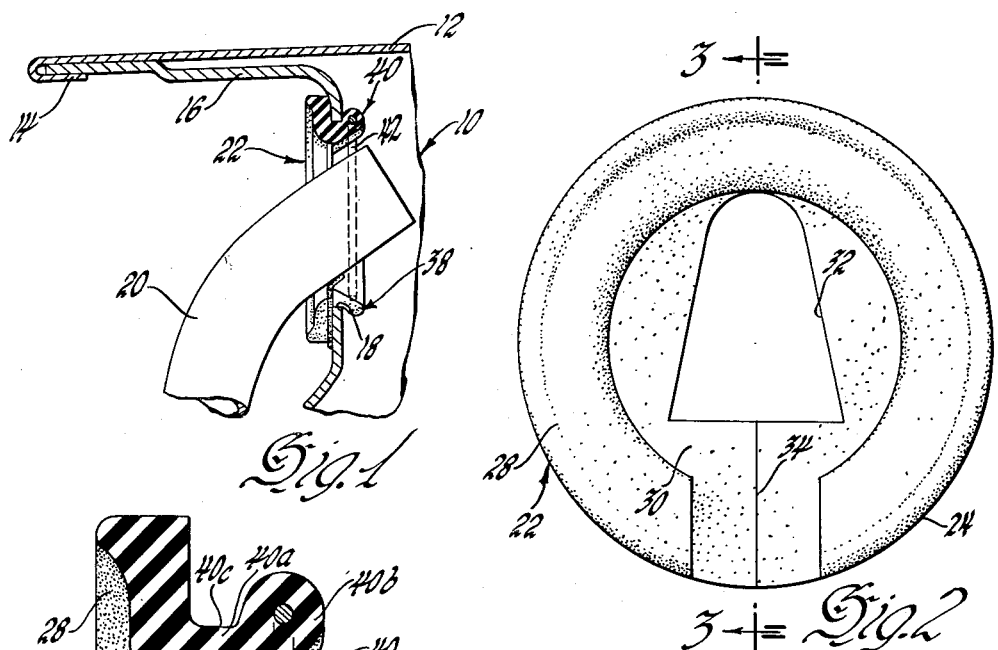
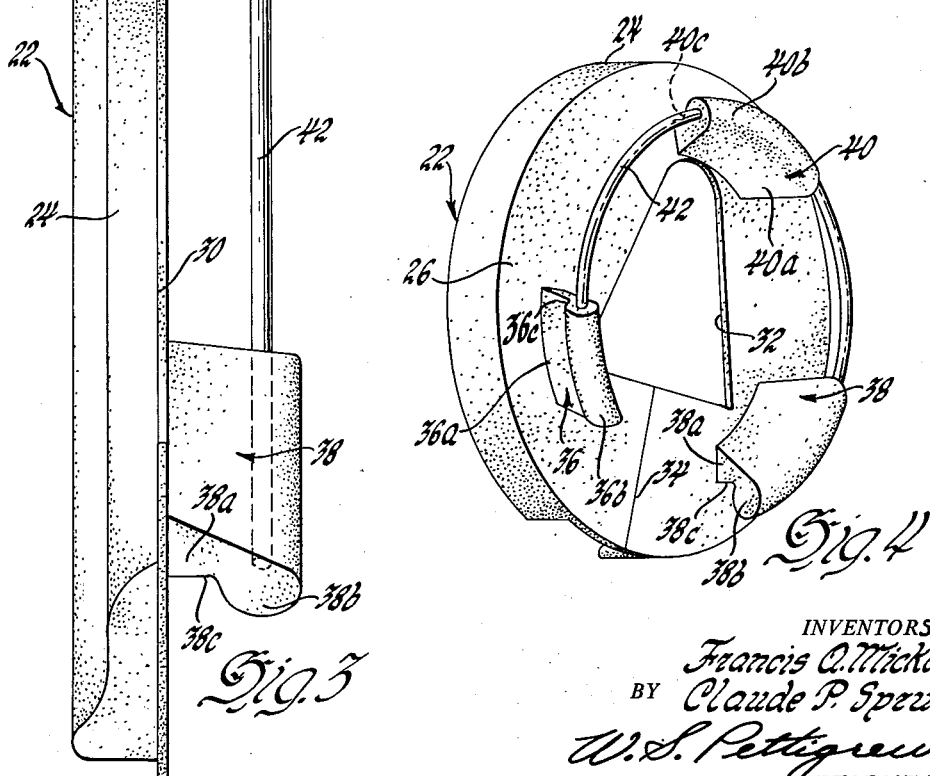
INVENTORS
Francis Q. Mickle &
BY Claude P. Sprunk
W. S. Pettigrew
ATTORNEY

United States Patent Office 3,064,984
Patented Nov. 20, 1962

3,064,984
SEALING GROMMET
Francis A. Mickle, Clarkston, and Claude P. Sprunk, Pontiac, Mich., assignors to General Motors Corporation, Detroit, Mich., a corporation of Delaware
Filed Aug. 20, 1959, Ser. No. 835,003
1 Claim. (Cl. 277—178)

This invention relates to a grommet, and more particularly to a grommet for sealing around a conduit.

One feature of the invention is that it provides an improved grommet; another feature of the invention is that it provides a conduit sealing grommet which is split to adapt it to receive the conduit more readily and to provide for easier mounting on a body, the grommet having improved mounting and holding means; a further feature of the invention is that it provides a grommet, the sealing surface of which has a plurality of spaced attaching tabs projecting therefrom and a spring wire secured to and interconnecting each of said attaching tabs; and yet another feature of the invention is that the attaching tabs are integral with the body, each tab having a base portion projecting from said sealing surface inside the periphery thereof and an enlarged head extending toward said periphery, the spring wire being molded into the head portion of each tab to provide a spring bias to expand said tabs into holding engagement with the wall of the opening in which the grommet is mounted.

Other features and advantages of the invention will be apparent from the following description and from the drawings, in which:

FIG. 1 is a horizontal section through a portion of an automobile door having the improved sealing grommet mounted thereon;

FIG. 2 is an enlarged elevational view of the grommet removed from the door;

FIG. 3 is a further enlarged section through the grommet, taken along the line 3—3 of FIG. 2; and FIG. 4 is an isometric rear view of the improved grommet.

In automobile construction, it is often necessary to pass a conduit to the interior of the body walls or between the inner and outer walls of a door. One particular instance of the use of a conduit of this type is in power window regulator control apparatus in which an electric pneumatic or hydraulic conduit extends into the automobile door for connection to the window regulator motor means. In the past, it has been conventional to utilize a grommet having a full circular attachment ring projecting from its sealing surface for insertion into a circular opening in a panel of the door. The sealing ring, after being compressed to insert in the opening, would expand into holding engagement with the walls of the opening. If the opening was slightly too large, the grommet would not be held securely in place. On the other hand, if the opening happened to be slightly too small, it would prove to be difficult or impossible to insert the ring in the opening, particularly when the conduit extended through the grommet. Attempts have been made to use grommets in which the full circular sealing ring was replaced by a plurality of attaching tabs, but grommets of this type have failed to provide a tight seal or to hold securely in place. The purpose of a grommet of this type is to seal the opening around the conduit, and it is desirable to have a tight seal both between the grommet and the conduit which extends through the grommet and between the sealing surface of the grommet and the wall of the door or body opening.

This invention provides an improved grommet wherein the conventional full circular sealing ring is replaced with a plurality of spaced spring-biased attaching tabs which project from the sealing surface of the grommet, each tab having a base portion projecting from the sealing surface inside the periphery thereof and an enlarged head extending toward the periphery. A spring wire is secured to and interconnects each of said attaching tabs to provide a bias to expand the tabs into holding engagement with the wall of the opening. With this improved attaching means, we have found that we can slit the grommet in order to make it more readily adapted to receive the conduit. At the same time, the replacement of a complete circular attachment ring with a plurality of spaced spring-biased tabs makes it relatively easy to mount the grommet on the door or body and the spring wire interconnecting the tabs provides sufficient force to insure that the grommet will be securely attached.

Referring now more particularly to the drawings, FIG. 1 shows a portion of an automobile door designated generally as 10 and having an outer panel 12 which is secured by a pinch weld flange 14 to a panel 16 which defines the jamb face of the door. The panel 16 has a circular opening 18 formed therein for the reception of a conduit 20. This conduit, which may be pneumatic, hydraulic, or electrical, extends between a conventional power source and a mechanism in the door which is to be operated, as for example, a window regulator.

The conduit 20 extends into the door through a sealing grommet designated generally as 22 and which is shown in detail in FIGS. 2, 3, and 4. The grommet 22 has a circular body 24 of rubber, the rear face 26 of which is planar to provide a sealing surface against the panel 16 around the circular opening 18. The body of the grommet has a peripheral thickened rim 28 and a relatively thin central portion 30 which, as shown best in FIGS. 2 and 4, is formed with an opening 32 to receive the conduit 20. The body is split by a slot 34 extending from the periphery of the body into said central opening. This split arrangement provides for easy insertion of the grommet into the panel opening 18, and the thickened rim 28 stiffens the body of the grommet and insures that the grommet will seal against the panel 16 entirely around the edge of the opening 18.

A plurality of equally spaced attaching tabs 36, 38, and 40 are formed integrally with the rubber body of the grommet and project from the sealing surface 26 thereof. Each tab has a stem portion 36a, 38a, and 40a, respectively, projecting from the sealing surface inside the periphery thereof and an enlarged head 36b, 38b, and 40b, respectively, integrally formed on the stem and extending toward said periphery so that the sealing surface 26, the stem of the tab and the head thereof form a notch designated as 36c, 38c, and 40c in the respective attaching tabs.

In order to provide a spring bias to expand the tabs 36, 38, and 40 into holding engagement with the wall of the panel opening 18, there is an arcuate spring wire 42 which is molded while under compression into the head portion of each tab and which connects the tabs together to provide the desired bias. As shown in FIG. 4, this wire does not extend across the slot 34 between the attaching tabs 36 and 38. In its free form before compression, the spring wire describes an arc having a radius greater than the radius when the wire is mounted on the attaching tabs as in FIG. 4, so that the wire exerts a constant outwardly directed spring bias. The arcuate spring wire does not describe a full circle.

With this improved construction, the grommet may be deformed from its normal shape and easily inserted into the panel opening 18 so that the wall of this opening seats in the respective notches 36c, 38c, and 40c of the spaced attaching tabs. Even if the conduit 20 is of such a size that it tends to expand the grommet, the utilization of three spaced attaching tabs in combination with the split body of the grommet makes it easy to insert the grommet in place in the panel opening and the expanding bias exerted by the spring wire 42 insures that the grommet will be securely mounted in the opening.

While we have shown and described one embodiment of our invention, it is capable of many modifications. Changes, therefore, in the construction and arrangement may be made without departing from the spirit and scope of the invention as set forth in the appended claim.

We claim:

A sealing grommet of the character described, including: a circular body of elastic material having a generally planar sealing surface adapted to overlie an opening to be sealed, said body being formed with a central opening therethrough for the reception of a conduit and said body being split by a slot extending from the periphery thereof into said conduit opening; a plurality of spaced attaching tabs integral with said body and projecting from said sealing surface at locations spaced around said central opening, each tab having a stem portion projecting from said sealing surface inside the periphery thereof and an enlarged head extending toward said periphery; and a spring wire molded into the head of each tab while under compression so that said wire exerts a constant outwardly directed spring bias to expand said tabs into holding engagement with the wall of said opening, opposite ends of said wire lying on opposite sides of said slot.

References Cited in the file of this patent

UNITED STATES PATENTS

| | | |
|---|---|---|
| 2,517,693 | Mead et al. | Aug. 8, 1950 |
| 2,668,316 | Sturtevant et al. | Feb. 9, 1954 |
| 2,820,088 | Sperry | Jan. 14, 1958 |